Aug. 14, 1945.    E. F. SARVER    2,382,105
ROTO-THRUST CONVERTER
Filed April 15, 1943    2 Sheets-Sheet 1
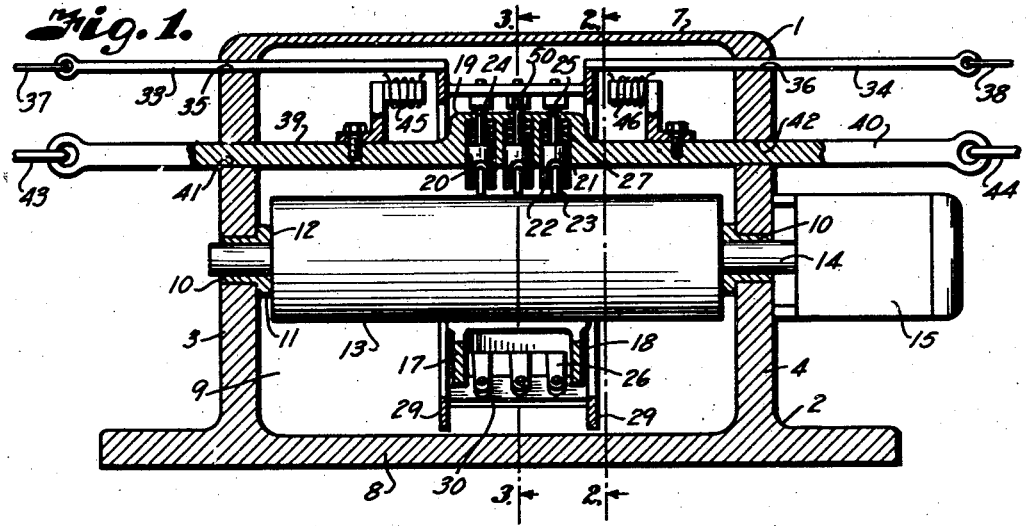
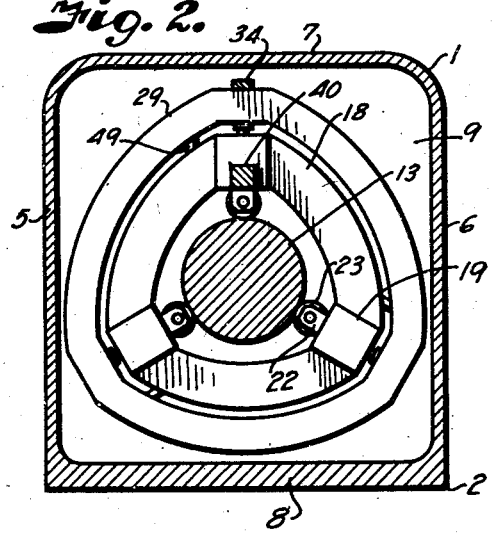
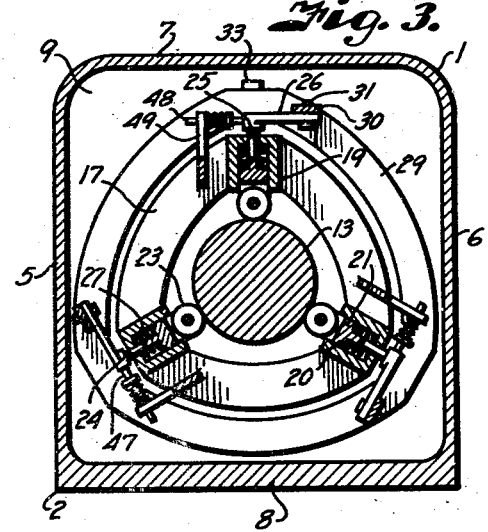
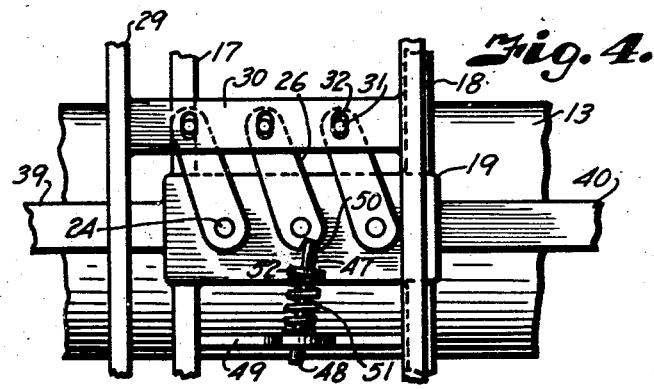
INVENTOR
Emmett F. Sarver
BY
Arthur C. Brown
ATTORNEY Aug. 14, 1945.  E. F. SARVER  2,382,105
ROTO-THRUST CONVERTER
Filed April 15, 1943  2 Sheets-Sheet 2
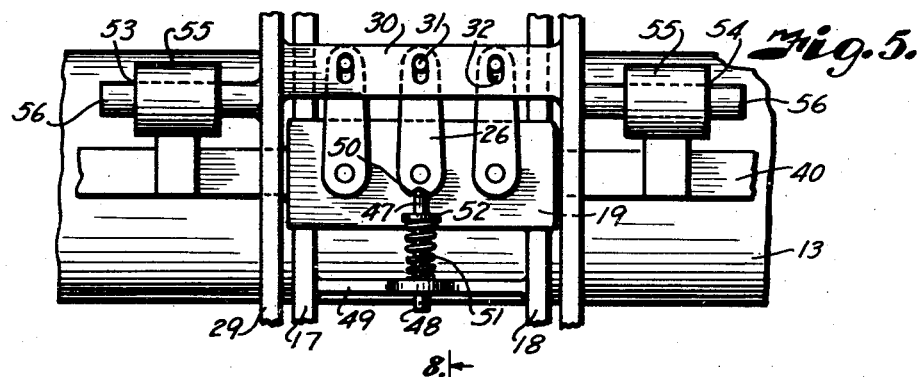
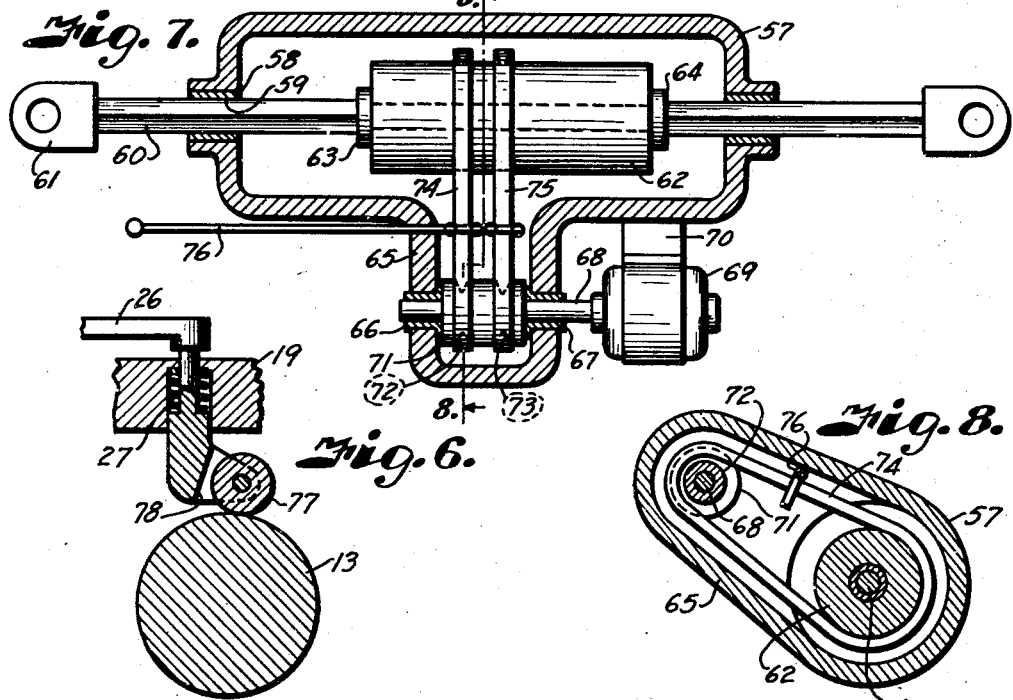
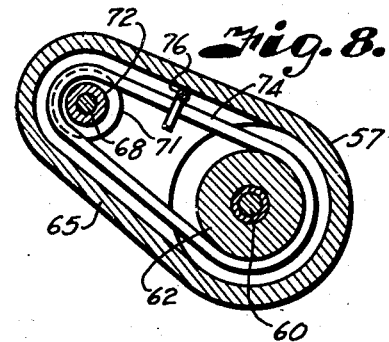
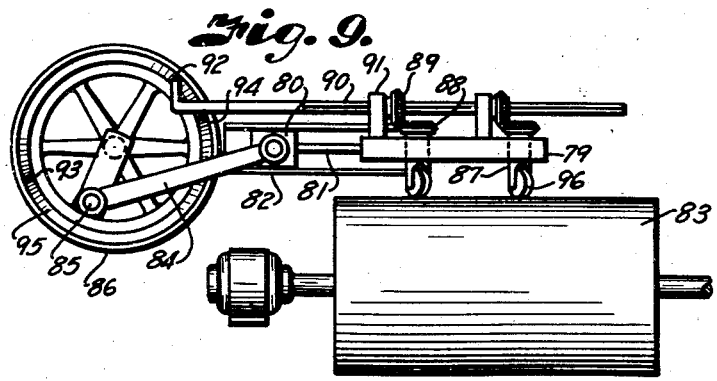
INVENTOR
Emmett F. Sarver.
BY
Arthur C. Brown
ATTORNEY Patented Aug. 14, 1945

2,382,105

UNITED STATES PATENT OFFICE 2,382,105

ROTO-THRUST CONVERTER

Emmett F. Sarver, Wichita, Kans., assignor of one-half to O. W. Wortman, Wichita, Kans.

Application April 15, 1943, Serial No. 483,135

9 Claims. (Cl. 74—25)

This invention relates to an apparatus for converting rotary motion to linear motion and has for its principal objects to provide a device of this character by which the linear motion can be adjusted through a wide range of speeds. Further objects of the invention are to provide for reversal of the linear motion at any selected point and to provide for stopping of the linear motion in any position of a member acted upon by the device. Other objects of the invention are to provide a converter which permits independent actuation of a member operated thereby in case of failure of the driving power and to provide a variable speed converter especially adapted for power control of the ailerons and other control surfaces of an aircraft.

In accomplishing these and other objects of the invention, I have provided improved details of structures, the preferred forms of which are illustrated in the accompanying drawings herein.

Figure 1 is a vertical section through a device involving the features of the present invention.

Figure 2 is a cross section on the line 2—2 of Figure 1.

Figure 3 is a similar cross section on the line 3—3 of Figure 1.

Figure 4 is a fragmentary plan view of the control cranks for changing pitch of the driven wheels for regulating speed of and stopping the linear motion.

Figure 5 is a view similar to Figure 4 but showing the control cranks operated by solenoids.

Figure 6 is a cross section through a modified form of the invention showing a castor mounting for changing pitch of the control wheels.

Figure 7 is a section through a modified form of the invention.

Figure 8 is a cross section on the line 8—8 of Figure 7.

Figure 9 is a side elevational view partly diagrammatic of a form of the invention wherein linear motion is automatically reversed, and rotary motion is converted by linear motion to rotary motion of a different speed.

Referring more in detail to the drawings:

1 designates the preferred embodiment of my invention which I have termed a "roto-thrust converter" in that it is designed to convert rotary motion of a driving member to a lateral thrust or linear motion of a driven member. The device includes a housing 2 having end walls 3 and 4, side walls 5 and 6, a top 7 and a base 8 to form a closed compartment 9 for containing the working parts of the converter as now to be described.

Formed in the end walls 3 and 4 are bearings 10 having facing and flanges 11 forming thrust bearing surfaces 12 to maintain a roller or driving drum 13 in fixed axial relation with respect to the housing. The roller or drum 13 is fixed upon a shaft 14 which has the ends thereof journalled within the bearings 10. One end of the shaft projects from the housing to connect with the armature shaft of a driver such as a motor 15, the motor 15 being mounted on the adjacent end wall of the housing or otherwise suitably supported so that when energized, it actuates the shaft 14 to rotate the driving drum or roller.

Mounted circumferentially of the roller or driving drum is a wheel carrier 16 which includes laterally spaced bars 17 and 18 interconnecting a series of wheel fork housings 19. In the present instance, three wheel housings are illustrated, as shown in Figures 2 and 3. The housings 19 have a series of bores 20 extending inwardly from the interior faces of the housings to rotatably accommodate the hubs 21 of wheel forks 22, which forks carry wheels 23 having their peripheries supported in contact with the cylindrical surface of the roller or drum 13.

The wheel supporting forks have axial stems 14 of smaller diameter than the hubs and which project through suitable openings 25 in the housings to mount crank arms 26. The wheels 23 have rounded faces supported in contact with the surface of the drum 13 by means of springs 27 having one end bearing against the bottom of the respective bores and their opposite ends against the hubs of the forks 22. All of the sets of wheels thus exert substantially equal thrust on the driving drum so that the carriage is retained in substantially axial relationship therewith for movement along the length of the drum at selected speed as now to be described.

Mounted circumferentially of the wheel carriage is a control carriage 28 comprising spaced ring-like members 29 interconnected by cross bars 30 to which the ends of the sets of crank arms are connected by pin and slot connections 31 and 32. Connected with the control carriage and extending laterally therefrom are control rods 33 and 34 slidably supported in openings 35 and 36 in the end walls of the housing and having connection with control cables 37 and 38 by which the control carriage may be operated from a remote point to turn the wheel forks relatively to the driving drum whereby the driven wheels engaged therewith are caused to change their angles or pitch with respect to the rotational direction of the driving drum whereby a lateral thrust is effected on the wheels so as to effect movement of the wheel carriage in the direction toward which the wheels are shifted, the speed of advance depending upon a degree of angle or pitch between the axes of the driven wheels and the driving drum or roller. The greater the angle, the faster is the movement of the carrier toward the end of the roller or driving drum.

In order to utilize the lateral thrust effected by the rollers, the wheel carrying carriage is provided with laterally extending bars 39 and 40 which are slidably supported in openings 41 and 42 in the end walls of the housing and which are connected with cables 43 and 44 adapted to be connected with the members to be actuated; for example, the ailerons of an aircraft. If desired, the control carriage may be shifted relatively to the wheel carriage to actuate the crank arms by means of electro magnets 45 and 46 that are mounted on the bars 39 and 40 as shown in Figure 1, the poles of the magnets being arranged to attract the ring-shaped members of the control carriage. It is obvious that the electro magnet may be connected with suitable control switches (not shown) which may be located, for example, in the cockpit of the aircraft in convenient reach of the pilot or actuated by an automatic pilot.

The wheels may be yieldingly retained in neutral position by means of plungers 47 having one end 48 slidably mounted in cross bars 49 on the carrier and which has its other end engageable in a notch 50 in the hub portion of one of the crank arms; for example, the central crank arm in Figure 4.

Mounted on the plungers is a coil spring 51 having one end bearing against the cross bar 49 and the opposite end against a collar 52 on the plungers. With this arrangement, the spring keeps the plungers in contact with the notch and normally retains the crank arms in position so that the axes of the wheels are parallel with the axis or driving drum or roller.

In operating the device constructed and assembled as described and assuming that the actuating cables 43 and 44 are connected with the actuating levers of the ailerons or control surfaces of an aircraft and that the control cables 37 and 38 are connected with a suitable lever or wheel (not shown) in the cockpit of the airplane (also not shown), the motor 15 may be actuated at a constant speed. The ailerons may be supported in any fixed adjusted position merely by adjusting the control carriage so that all of the wheels 23 have their axes parallel with the axis of rotation with the driven roller. The wheels thus are rotated in the same direction as the driving roller and no lateral thrust is effected on the wheel carrier to the actuating rods.

Assuming that the pilot wishes to change position of the control surfaces, he actuates the control cables 37 and 38 to shift the control carriage 28 in the desired direction; for example, to the right in Figure 1. This movement of the control carriage partially rotates the crank arms 26 to journal the wheel forks 22 in their respective bores 20 so as to change the pitch angle of the axes of the driven wheels relatively to the driving roller or drum. It is evident that the wheels will turn through contact with the drum and that when the axes of the wheels are turned out of parallelism with the axis of the drum, the wheels will tend to urge their supporting forks to the right which results in lateral or linear movement of the carrier and actuating bars to the right at a speed depending upon the pitch of the wheel axes relatively to the axis of the driving roller.

When the desired amplitude of the control surfaces has been obtained, movement of the control cables 37 and 38 in the opposite direction causes the axes of the wheels to align in parallel relationship with the axis of the driving roller. Now the wheels all rotate in the direction of the driving roller without producing lateral thrust or movement of the wheel carrier. Consequently, the ailerons are held in the new position until the control cables are again moved. The amount of force that can be exerted on the actuated mechanism is, of course, the difference between the rolling friction and the sliding friction of the wheels on the surface of the driving drum. For different applications, the sliding friction can be determined and varied widely by facing the drum or the wheels or both with surfaces of different characteristics such as leather, rubber, steel, etc. In event of failure of the moving power, for example, the motor 15, the pilot can overpower the device by simply pulling hard enough on the control cables to slip the wheels on the driving drum so that the control surfaces may be moved to adjusted position without action of the rotary converter mechanism. This is because movement of the cranks is limited to a definite arc of travel by suitable stops such as the magnets 45 and 46 so that movement of the control carriage produces a like movement of the wheel carriage. This is an important feature of the invention as one of the big problems in the aircraft industry is to provide a simple fool-proof manual actuation of the control surfaces in case the power operating device should fail.

If it is desired to automatically control the plane equipped with the invention as described, by means of electric signals, the electro magnets 45 and 46 may be connected with an energizing mechanism activated by signal impulses, so that when the proper signals are received, one or the other of the magnets is energized to effect desired movement of the control surfaces of the airplane through power of the motor 15.

The form of the invention illustrated in Figure 5 is substantially the same as shown in Figures 1 to 4 inclusive except that solenoids 53 and 54 including coils 55 and armatures 56 are utilized instead of electro magnets for controlling the pitch of the wheels relative to the drum 13.

The form of the invention illustrated in Figure 7 includes a housing 57 having bearings 58 in the opposite ends thereof having bores 59 corresponding to the cross sectional shape of a thrust transmitting rod 60 having connections 61 at the ends thereof for the actuating cables (not shown). The rod is thus freely slidable in the casing but is retained from rotation therein. The central portion of the rod is of cylindrical cross section to rotatably mount a driving roller or drum 62, which drum is retained in position by collars 63 and 64 engaging the respective ends thereof. The housing is provided with a lateral extension 65 having bearings 66 and 67 mounting a driving shaft 68 of a motor 69, the motor being attached to a side of the housing by a suitable bracket 70.

Fixed on the shaft 68 within the housing extension 65 is a pulley 71 having peripheral grooves 72 and 73. Operating in the grooves 72 and 73 and over the cylindrical surface of the drum 62 are endless belts 74 and 75. It is obvious that when the belts are operating in the plane of the grooves of the pulley, the drum 62 will be rotated without producing end thrust on the rod 60 through the collars 63 and 64 but as lateral pressure is applied to the belts by means of a shift rod 76 tending to move them out of their normal plane of travel, sufficient lateral thrust is produced on the belts to cause endwise movement of the driven roller which effects like movement in the rod 60 to operate the controls in the direction, depending upon the direction in which the shifting pressure is applied to the belts.

The driven wheels 77 shown in Figure 6 appertain to the form of the invention illustrated in Figures 1 to 5 inclusive but they have a modified mounting. In this form of the invention, the driven wheels 77 are mounted in castor forks 78 so that the axes of the wheels 77 are offset from a parallel plane extending through the axis of the driving drum. With this arrangement, the thrust produced will react to a predetermined amount depending upon the offset of the wheel axes to the plane above noted. This arrangement may be desirable in some installations, particularly when the pilot might wish to know by the "feel" the amount of force expended on a control surface to move it and again it might be desirable to make the device rod sensitive as in the case of converting the motion back to rotary member so that an increased load on the wheel shafts would react to cause a decrease in pitch of the castors and thus increase the differential speed of the motor driven roller over the linear speed of the wheel carriage.

In the form of invention shown in Figure 9, the wheel carrier 79 actuates a crosshead 80 through a connecting rod 81, which crosshead is reciprocably mounted in a slide 82 that is suitably supported in fixed relation relatively to a support (not shown) for the driving drum 83. Connected with the crosshead is a pitman 84 that is connected with a wrist pin 85 on a wheel 86 whereby the wheel is rotated responsive to reciprocation of the wheel carrier 79 along the length of the driving drum 83. In this instance, the fork carriers 84—87 for the driven wheels are actuated by bevel gears 88 having driving connection with bevel gears 89 slidably keyed on a rod 90.

In the illustrated instance, the rod 90 is supported in bearings 91 on the carrier 79 and has one end terminating in a lateral arm 92. The arm is successively engaged with high and low lobes 93 and 94 on a cam ring 95 fixed to the wheel 86. With this arrangement, the driving drum 83 rotates the driven wheels 96 to produce a lateral thrust necessary to move the carrier in one direction of the winding drum.

At the time the wheels approach one end of the drum, one of the lobes of the cam has rocked the rod 90 to cause the gears 88 and 89 to reverse angular relationship of the driven wheels with respect to the drum whereupon the thrust imparted to the driven wheels reverses movement of the carrier to the opposite end of the rotating drum. It is thus obvious that with this arrangement, a roto converter may be adapted for continuous reciprocable motion of the carrier, which motion may be used in any desired manner.

From the foregoing, it is obvious that I have provided a roto converter whereby rotary motion may be transposed to a variable speed linear motion which may be utilized in any desired manner such as in operating the control surfaces of an aircraft.

What I claim and desire to secure by Letters Patent is:

1. An apparatus of the character described including, a drum, means mounting the drum for rotation on the axis thereof, a wheel carrier, means mounting the wheel carrier for movement longitudinally of the axis of the drum, a wheel in rotational contact with the drum, means mounting the wheel for turning movement in the wheel carrier to adjust the rotational axis of said wheel angularly of the axis of the drum to cause advance of the wheel carrier along the drum when the drum is actuated, a control member, means connecting the control member with said wheel mounting means to selectively turn said wheel, and secondary means for turning said wheel including an electro magnetic means having connection with the wheel carrier.

2. An apparatus of the character described including, a housing, a drum having rotatable support in the housing, means for rotating the drum, a wheel carrier, means supporting the wheel carrier for reciprocation in the housing longitudinally of the rotational axis of said drum, a wheel having journal support by the wheel carrier, a turning crank for said wheel, means yieldingly retaining the wheel in rotational contact with the drum, control means having limited independent movement relatively to the wheel carrier, and means interconnecting the control means with the turning crank for turning said wheel selectively in the wheel carrier for effecting advance of the carrier upon shifting of the control means.

3. An apparatus of the character described including, a casing, a drum rotatably supported in the casing, a plurality of sets of wheels, a wheel carrier circumferentially of the drum, forks rotatably mounting said wheels, stems on the forks and journalled in the wheel carrier, a control means having limited independent movement relatively to the wheel carrier in the axial direction of the drum, cranks on said stems having connection with the control means to simultaneously shift said wheels on the drum for imparting thrust on the wheel carrier when the control means is shifted relatively to the wheel carrier, and means connecting the wheel carrier with a member to be actuated.

4. An apparatus of the character described including, a drum member, a wheel carrying member, means mounting one of said members for movement longitudinally of the other member, a wheel in rotational contact with the drum member, means mounting the wheel for turning movement in the wheel carrying member, a crank for turning the wheel angularly of the axis of the drum member to cause advance of the longitudinally movable member when the drum member is actuated, a control member connected with said crank, and secondary control means for actuating the crank.

5. An apparatus of the character described including a housing, a drum, means rotatably mounting the drum in the housing for rotation about a fixed axis, a bar member having reciprocatory support in the housing in the axial direction of the drum, a wheel having frictional contact with the drum, a support for said wheel having rotational support by the bar member, a crank connected with the wheel for turning the wheel on the drum, a control rod slidably supported in the housing, and means connecting the control rod with the crank for positioning the wheel relative to the drum to cause movement of the bar member in the housing.

6. An apparatus of the character described including a housing, a drum, means rotatably mounting the drum in the housing for rotation about a fixed axis, a bar member having reciprocatory support in the housing in the direction of the drum, a wheel having frictional contact with the drum, a support for said wheel having rotational support by the bar member, a crank connected with the wheel for turning the wheel on the drum, a control rod slidably supported in the housing, means connecting the control rod with the crank for positioning the wheel relative to the drum to cause movement of the bar member in the housing, an electro magnet mounted on the bar member, an armature associated with the electro magnet and having connection with the control rod to effect positioning of said wheel independently of the control rod, and means for moving the crank to turn the wheel in the opposite direction.

7. In an apparatus of the character described, a pair of rotatable members having frictional driving connection with each other to effect rotation of one member when the other member is rotated, means supporting one member for progressive movement longitudinally of the axis of rotation of one of said members, primary means for imparting an axial thrust on one member to effect progressive movement through said frictional driving connection, and secondary means for imparting said axial thrust.

8. An apparatus of the character described including a drum, means mounting the drum for rotation on the axis thereof, a wheel carrier for movement longitudinally of the axis of the drum, a wheel in rotational contact with the drum, means mounting the wheel for turning movement of the wheel carrier to adjust the rotational axis of said wheel angularly of the axis of the drum to cause advance of the wheel carrier along the drum when the drum is actuated, an armature connected with said wheel mounting means, and an electro magnet carried on the wheel carrier for attracting the magnet to effect said angular movement of the wheel.

9. An apparatus of the character described including a drum, means mounting the drum for rotation on the axis thereof, a wheel carrier coaxially of the drum, a plurality of friction wheels contacting the drum about the periphery thereof, means for rotatably supporting said wheels, means mounting the supporting means in the wheel carrier, cranks connected with the wheel supporting means, a control member coaxial of the wheel carrier and connected with said cranks, and means for shifting the control member relative to the wheel carrier for simultaneously changing the angular position of the wheels with respect to the drum.

EMMETT F. SARVER.